United States Patent [19]
Senba

[11] Patent Number: 5,940,313
[45] Date of Patent: Aug. 17, 1999

[54] PROGRAMMABLE SEQUENCE CONTROL DEVICE SIMULATING FLOW CHART SEQUENCES

[76] Inventor: Junichi Senba, 32-12, Minamiurawa 1-chome, Urawa-shi Saitama-ken, Japan

[21] Appl. No.: 08/839,307

[22] Filed: Apr. 18, 1997

[30] Foreign Application Priority Data

Apr. 23, 1996 [JP] Japan .................................. 8-135628

[51] Int. Cl.[6] .................................................. G06G 7/70
[52] U.S. Cl. ................... 364/802; 364/140.06; 364/188; 364/801; 395/843
[58] Field of Search ............... 364/140.06, 188, 364/801, 802; 395/843

[56] References Cited

U.S. PATENT DOCUMENTS 4,167,788  9/1979  Senba ........................... 364/802
5,633,813  5/1997  Srinivasan ..................... 364/578

*Primary Examiner*—William Grant
*Assistant Examiner*—McDieunel Marc
*Attorney, Agent, or Firm*—Venable; Robert J. Frank

[57] ABSTRACT

A memory, a memory address producing circuit, an internal control circuit, an output signal selecting circuit using a decoder and an input signal selecting circuit using a multiplexer are formed to provide a general purpose programmable sequence control device simulating flow chart sequences capable of programming sequences by simulating flow chart sequences almost as it is with a stored logic system increasing no circuit corresponding to a number of sequence stages and requiring no connections compared to the conventional wired logic system.

2 Claims, 6 Drawing Sheets

NOTE:

STAGE 4 IS NORMALLY INDEPENDENT, HOWEVER, CAN BE DESCRIBED IN STAGE 1 ACCORDING TO THE PRESENT SYSTEM. STAGE 5 IS THE SAME AS THE STAGE 4.

SUPPLEMENTARY NOTE 1

| A — $S_1$ | P — $T_1$ |
|---|---|
| B — $S_2$ | Q — $T_2$ |
| C — $S_3$ | K — $T_3$ |
|  | V — $T_4$ |

SYMBOLS ARE CORRECTED TO "BASIC FORM"

SUPPLEMENTARY NOTE 2

OPERATION A : "TURN ON A LAMP"
OPERATION B : "START A MOTOR A"
⋮
P : "SENSOR a TEST"
Q : "LIMIT SWITCH TEST"
⋮
"CONCRETE OPERATING STATUSES"

FIG. 5A

MEMORY INPUT BASIC FORM ( I )

| ADDRESS | SPECIFYING A SYMBOL SEPARATELY | | |
|---|---|---|---|
| 1 | $J_3$ |  | $T_1$ |
| 2 |  | $S_1$ |  |
| 3 |  |  | $T_2$ |
| 4 | $J_4$ | $S_2$ | $T_3$ |
| 5 | $J_2$ | $S_3$ | $T_4$ |

MEMORY INPUT BASIC FORM ( II )

| ADDRESS | J | S | T |
|---|---|---|---|
| 1 | 3 |  | 1 |
| 2 |  | 1 |  |
| 3 |  |  | 2 |
| 4 | 4 | 2 | 3 |
| 5 | 2 | 3 | 4 |

PROGRAMMABLE SEQUENCE CONTROL DEVICE SIMULATING FLOW CHART SEQUENCES

BACKGROUND OF THE INVENTION

1. Field of the Invention

The present invention relates to an improvement of a programmable sequence control device (U.S. Pat. No. 4,167,788 and Japanese Examined Patent Publication No. 56-21171) that the present inventor has previously developed, and particularly to a general purpose programmable sequence control device simulating flow chart sequences capable of programming sequences by simulating flow chart sequences almost as it is and of controlling one stage flow chart in one clock time when the sequences are executed.

2. Description of the Related Art

The programmable sequence control device that the present inventor has previously proposed is composed of three terminals; one is a sequence signal output terminal S, a jump condition signal input terminal T and a jump destination signal input terminal R; those three terminals constitutes one set. Adequate number of sets are formed corresponding to a number of sequences. Logical function circuits are formed for determining logic values of the sequence signals in a stage in which each logical sum (OR) of each logical produce (AND) of the first and the second terminal signals in each set is a first variable, a logic value of the third terminal signal in the stage is a second variable, and a logic value of the first terminal signal in a preceding stage is a third variable. Input/output signal lines of the circuits are connected to the terminals corresponding to the aforementioned logics and required signal delay circuits are connected serially to the first terminal, thereby one set of the terminals can be corresponded to any execution stage of any sequence program, as shown in FIG. 1.

In case of programming, for example, a content of a flow chart shown in FIG. 2, each terminal is connected as shown in FIG. 3 in which a circuit is constituted in a hard wired logic system. This system is extremely convenience and understandable. However, corresponding to a hard size, the above-mentioned set numbers must be increased and an applicable scope is limited as a matter of course because the connections are required.

An object of the present invention is to provide a general purpose programmable sequence control device simulating flow chart sequences capable of programming sequences by simulating flow chart sequences almost as it is with a stored logic system, increasing no circuit corresponding to a number of the sequence stages and requiring no connections compared to that of the conventional wired logic system.

SUMMARY OF THE INVENTION

According to the present invention, some difficulties in transition to the stored logic system are conquered to put it to practical use taking over the logic concept of the previous invention system as it is. By making the best use of advantages of the previous system, an application range (sequence stages) can be extremely extended. Details of the transition will be described later. A resultant schematic logic system of the present invention is as follows:

The present invention relates to a programmable sequence control device simulating flow chart sequences which is a logic system composed of a memory, a memory address producing circuit, a discrete bus for connecting to the address producing circuit, an internal control circuit for controlling separately an operation of the bus to transmit data corresponding to its purpose, an output signal selecting circuit and an input signal selecting circuit, in which a first control code for specifying one output signal to external, a second control code for specifying one input signal from the external, a predetermined branch destination code as required and a convention code relating to an external bus control in case of forming the external bus as required are written into the memory preliminary based on a programming specification for performing an intended operation, and in which the internal control circuit outputs a signal to perform a first to third controls for performing a predetermined operation in the logic system whose control signals update the memory address of the memory automatically, read continuously data written into the memory corresponding to its purpose by synchronizing with a clock signal, and operate the output signal selecting circuit by the control code when one of the control codes is read to operate one of plural output signals ready to be operated, and the control signals (i) specify one of the input signals from the external by operating the input signal selecting circuit with operating other control codes concurrently read with the control codes and input the specified input signal to the internal control circuit, (ii) input a convention code relating to the external bus control to the internal control circuit directly, and (iii) input the input signal directly from the external to the internal control circuit as required; each inputted signal of i), ii) and iii) is utilized for a "control" by setting a set of variables corresponding to each signal related the control, operating functions of the variables depending on their controlling purposes, setting a required number of the functions, and defining the set of variables separately depending on logical symbols so as to operate any one of the functions effectively for a specific control purpose under a specific condition of the signals to determine intended functions.

The intended functions thus determined become a hard logic. Output signals thereof control a discrete circuit related to the internal control, in other words, an incrementer, the memory and the external bus depending on their purposes.

The programmable sequence control device simulating flow chart sequences performs a first control for inputting data from the incrementer determining a code corresponding to a predetermined normal order to a memory address producing circuit resistor (herein referred to as the memory address producing circuit) via the bus, a second control for inputting a branch code outputted from the memory to the memory address producing circuit and a third control for inputting a content of the external bus to the memory address producing circuit, where one of the first to third controls is performed automatically whenever a memory address is updated.

BRIEF DESCRIPTION OF THE DRAWINGS

FIG. 5 shows a programming (memory writing basic form) for executing the flow charts of FIG. 2 in the circuit of the present invention.

DESCRIPTION OF THE PREFERRED EMBODIMENTS

Figure 4:
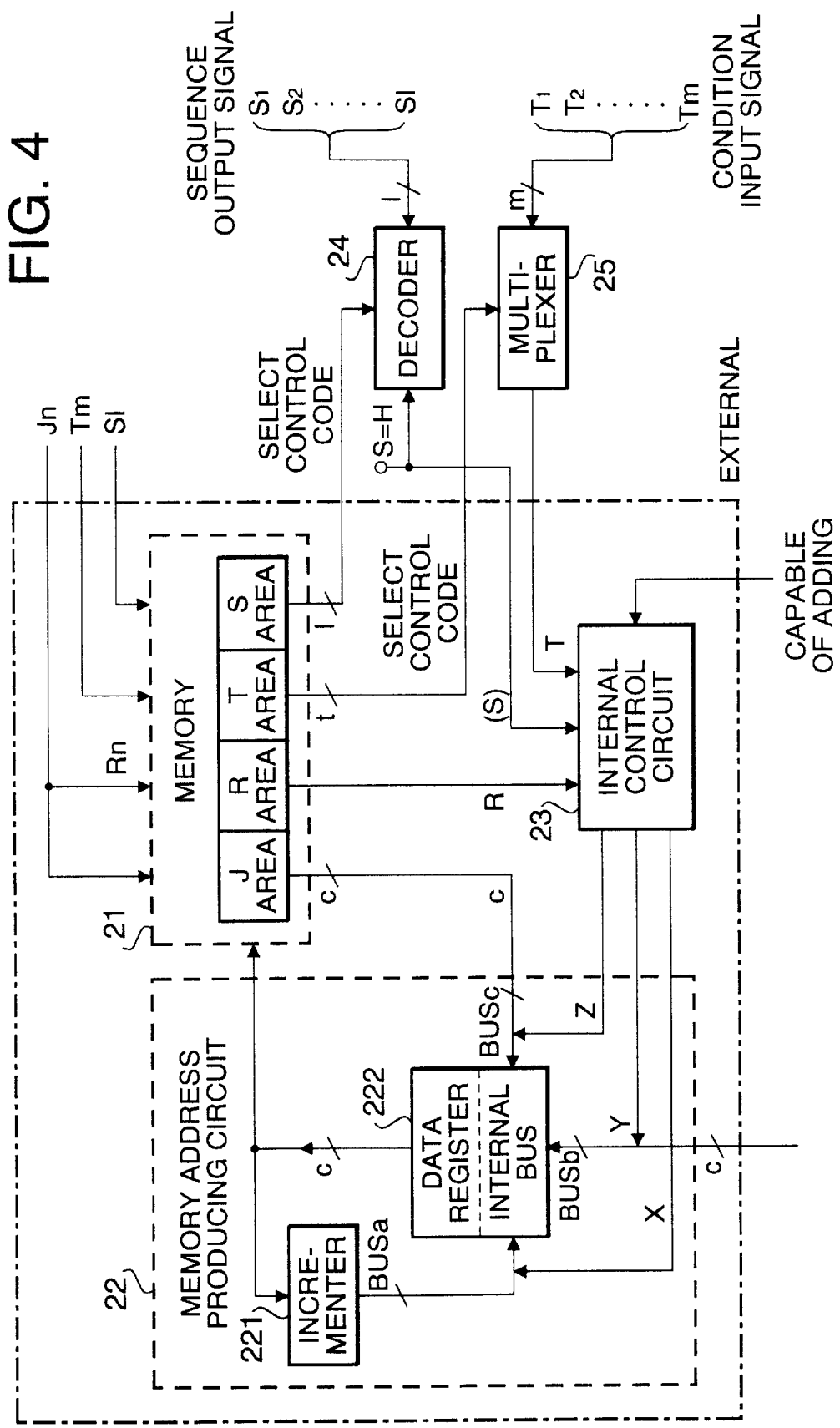
FIG. 4 is a block diagram of an embodiment according to the present invention.

FIG. 4 is a block diagram of an embodiment according to the present invention. Numeral 21 represents a memory, numeral 22 represents a memory address producing circuit, numeral 23 represents an internal control circuit, numeral 24 represents an output signal selecting circuit using, for example, a decoder, numeral 25 represents an input signal selecting circuit using, for example, a multiplexer. Symbols l, m, s, t, c and the like on a bus line or a signal line in FIG. 4 represent a bus width (width of a signal code), in other words, a number of bits.

A programmable sequence control device simulating flow chart sequences shown in FIG. 4 of the present invention will be described below comparing to a conventional programmable sequence control device (hereinafter referred to as "the conventional device") shown in FIG. 1 for promoting comprehension.

Apparent correspondences existed therebetween are portions designated with symbols $J_n$, $R_n$, $S_l$, $T_m$ and the like. These are existential terminal names in the conventional device, and may be signal names of wirings if they are existed. On the other hand, these symbols are existential input/output signal names and soft symbols when programming (these correspond to actual wirings of the conventional device) as well. (As to $J_n$, also see FIG. 3.)

In other words, a specification of each discrete element in programming of the present invention is approximately same as that of the conventional device.

In the conventional device, (a) a sequence output signal $S_l$, (b) a condition input signal $T_m$ and (c) a jump signal $J_n$ are provided as fundamental logic functions. These three types of signals are input/output signals in each terminal forming three terminals as one set at each sequence stage to control a predetermined operation (using the signals with wiring from $S_l$) in each sequence stage by a predetermined logic function.

On the other hand, in the present invention, a selecting code $S_l$ for specifying one of a plurality of output signals (sequence output signals) corresponding to the (a), a selecting code $T_m$ for specifying one of a plurality of inputs corresponding to the (b), a branch destination code $J_n$ for specifying a memory address at that point of time are written to each memory address corresponding to each sequence stage, respectively. Similarly, each data already stored on the memory is read corresponding to a subsequent stage and each logic function associated with each signal is operated to control the sequence as predetermined. In addition, R=H is written to the memory together with inputting $J_n$.

A term "jump" used in the conventional device has same meaning with "branch" used in the present invention.

A fundamental principle concerning the logic structure of the conventional device is represented by a following equation (1).

$$S_\tau = \{S_{\tau-1} + R(S_1T_1 + S_2T_2 + \ldots + S_mT_m)\}\overline{R(S_1T_1 + S_2T_2 + \ldots + S_mT_m)} \quad (1)$$

The equation (1) is already described in the U.S. Pat. No. 4,167,788, the fifth column, as equation (7) and its logical semantics are also described therein.

Consequently, the equation (1) is a fundamental logic of the conventional device and is included in each sequence stage as a fixed circuit.

Therefore, to clarify signal operation in the conventional device, in other words, a logical process of signal processings, it may be substituted a signal execution value for the equation (1). Thereby, table 1 is obtained.

Terminology will be defined as required.

In the conventional device, three terminals in each sequence stage are S, T and R, respectively, as described above. S is an output terminal of the sequence output signal, T is an input terminal of a condition input signal and R is an input terminal of a jump signal.

These signals display the terminals themselves and signals in the terminals as well.

The symbols with subscripts, for example, $T_m$ is a specific one of a plurality of T terminals and $S_l$ is any of the sequence output signal and the sequence control signal.

A difference between the sequence output signal and the sequence control signal is as follows: the former represents a valid signal produced in the terminal without an external wiring, the latter represents an available valid signal with the external wiring.

The sequence output signal may be called simply as a sequence signal, and the sequence control signal may be called simply as a control signal. Accordingly, it often happens that the sequence signal is existed, but the control signal is not existed at the stage.

Referring to the table 1, logical status segments I to IV represent all logical statuses of input/output signal of each terminal during operation. I to IV are as follows:

I: When R has no signal and the jump condition formation signal is not valid, the sequence output proceeds with a next stage.

II: When R has no signal and the jump condition formation signal is valid, the sequence output of the stage is "0". If all stages are under the condition, it becomes an initial condition. (END)

III: When R has a signal and the jump condition formation signal is not valid, the sequence output proceeds with the next stage.

IV: When R has a signal and the jump condition formation signal is valid, the sequence output proceeds with the stage where R has the signal skipping over adjacent some stages.

According to the present invention, the conventional system is transformed into the stored logic system as described above. Thereby, a main system configuration is a memory 21. Consequently, fundamental operation is read/write of the memory 21, which updates or changes the memory address, in other words, controls an input/output of data associated with the memory address. If leaving the output signal on outputting in the memory address producing circuit does not matter, only input control is remained.

In case of introducing the "control" into logical status segments in the table 1, controlling the segments I to IV is set as follows:

A control for obtaining same results as I and III is an order control.

A control for obtaining a same result as II is an END control.

A control for obtaining a same result as IV is a branch control.

Figure 1:
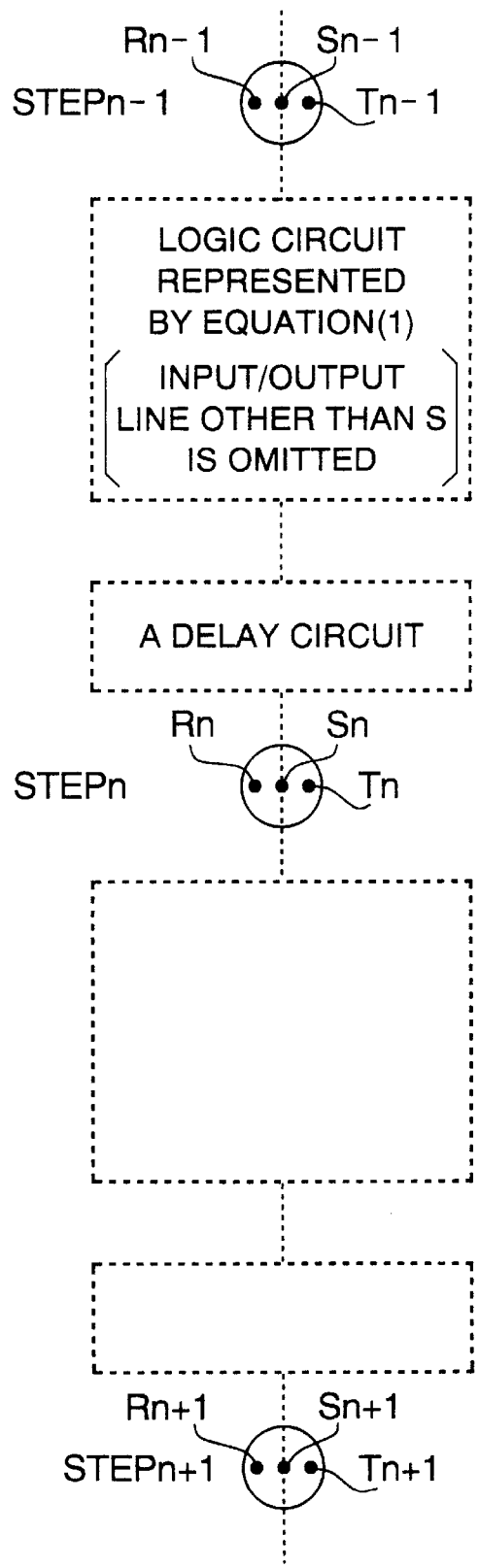
FIG. 1 is a block diagram of a conventional programmable sequence control circuit.

Referring to FIGS. 4 and 1, these controls are further defined.

(A) In the conventional device, the order control is to transmit the sequence output signal to the adjacent stage. On the other hand, in the present invention, the order control is to set a next memory address code (sequence stage code on the system) predetermined as a normal order to the memory address producing circuit 22.

(B) In the conventional device, the END control is to make all sequence outputs at all stages "0" (in other words, return to an initial stage). On the other hand, in the present invention, the END control is to set an initial status address code of an associated path to the memory address producing circuit 22.

(C) In the conventional device, the branch control is to produce the sequence output at any predetermined other stage. On the other hand, in the present invention, the branch control is to set a predesignated specific memory address code to the memory address producing circuit 22.

In determining logic functions for the aforementioned controls, the logic concept of the conventional device is inherited, considering applicability of the equation (1). The equation (1) becomes as follows:

$$S_1T_1+S_2T_2+\ldots S_mT_m=T_1+T_2+\ldots T_m$$

$$T_1+T_2+\ldots +T_m=T$$

Apparent from FIG. 4, S=H=1 according to the present invention. The input signals $T_1$ to $T_m$, in other words, $T_1+T_2+\ldots +T_m$ are inputted to the system as T.

Consequently, the equation (1) is equivalent to a following equation (2).

$$S_\tau=(S_{\tau-1}+RT)\overline{\overline{RT}} \qquad (2)$$

For a convenience, a right side bracket is removed, then a following equation (3) is appeared.

$$S_\tau=S_{\tau-1}\cdot\overline{\overline{RT}}+RT\cdot\overline{\overline{RT}} \qquad (3)$$

According to the table 1, a value of the equation (1) (in other words, the equation (3)) is as follows:

1. the value of the equation (1) is 'S' or any of H/L in the status segment I or III.
2. the value is always 'L' in the II as a result of logical sum of the first term and the second term.
3. the value is always 'H' in the IV as a result of logical sum of the first term and the second term.

Referring back to the table 1, to obtain functions corresponding to description of the I, II, III and IV, execution logic values of variables per segment in the table 1 are substituted for the fundamental equation (1) and the logic equation (2) which is equivalent to the (1).

a function equivalent to the I: $x=(S+\overline{RT})\ \overline{RT}$
a function equivalent to the II: $y=(S+\overline{RT})\ \overline{RT}$
a function equivalent to the III: $x'=(S+R\overline{T})\ \overline{R}\ \overline{T}$ and,
a function equivalent to the IV: $z=(S+RT)\ \overline{RT}$ are obtained.

For simplifying,
 i) S term is omitted unconditionally because values y and z of the functions are not depended upon the S as apparent from resultant logic values of the II and IV in the table 1.
 ii) Because a concrete logic value of the I in the table 1 is $\overline{RT}=1$, a equation $S=S\overline{RT}$ is reasonable. Consequently, the equation is substituted for the right side of x, $$x=(S\ \bar{R}\ \bar{T}+\bar{R}\ \bar{T})\ \overline{RT}=\bar{R}\ \bar{T}\ (S+1)\ \overline{RT}=\bar{R}\ \bar{T}\cdot\overline{RT}$$

iii) Similarly, $$x'=R\bar{T}\cdot\overline{\bar{R}\ T}$$

Accordingly, these functions are arranged depending on purposes:

| an order control function | $X = x + x' \ldots (4)$ |
| an END control function | $Y = \bar{R} \times T \times \overline{RT} \ldots (5)$, and |
| a branch control function | $Z = R \times T \times \overline{RT} \ldots (6)$ | are introduced. Each function can be more simplified. The simplified results are consistent with a content of i) "a condition for describing the logic" described later.

The functions X, Y and Z can be used practically as shown in FIG. 4 as hard logics and their outputs as aforementioned control signals.

As described above, convenience in the conventional device can be inherited and utilized in the present invention by transporting and transferring the logic concept of the conventional device to the present invention.

In addition, it is verified that a "control logic" which is a main function in operating the system can be introduced with the equation (1) which is the fundamental logic of the conventional device from the above-mentioned circumstances.

However, a "control logic" of the present invention may not necessarily be introduced with the above method, because other introducing method is generalized as a control logic function in the system assuring the same logic operations as a result.

A point of the introducing method is described in SUMMARY OF THE INVENTION.

Namely, a set of variables corresponding to each signal concerning the control is set, intended functions of the variables are determined depending on their control purposes, the set of variables is defined separately according to logical symbols so as to operate only one of the functions effectively for a specific control purpose under a specific condition of the signals to determine intended functions.

During such function defining process, discrete code (symmetry code) constituting any code table (herein a binary code table is used) is contrasted with a logical symbol expression of the 'variables' to fix a correspondence (position) therebetween (one is a binary code which is a symmetry code and one is a logic code of the logical symbol expression) as means for checking with a temporal symmetry code.

For example, in table 2, the binary code HLHL and the logical symbol expression code p×R$\bar{T}$ are consistent, therefore both codes are shown in a same column of a code number "10". In other words, it shows that both codes are consistent. (x mark represents any of H/L.)

The plural signals concerning the control is concretely R, T, i and p. Conditions of describing logically them as variables of the function for operating aimed operation are:

i) As to R and T, a operating condition of $\overline{RT}$ is equal to the operating condition of the signal in the logical status segment I, that of $\overline{R}T$ is equal to that in the segment II, that of $R\bar{T}$ is equal to that in the segment III, and that of RT is equal to that in the segment IV.

ii) i is an interrupt request signal capable of being newly added, is operated under a negative logic (active "L") and is permitted to be operated in only I and III among the I to IV.

iii) p controls the signals R and T described in i), and is operated under a positive logic (active "H").

Now going back to the method for determining the functions, there is two aspects available in describing measures of associated circuits, regardless of one logical description (regarding the functions).

As one aspect, the logical description regarding the variables functions as a select code itself which is required for decoding an original signal. In other words, a circuit can be configured using a commercial logic device. Aimed function values are obtained from output terminals of a device used. It is convenient because orders of the terminals correspond directly or indirectly to code numbers in the table.

As other aspect, regarding the logical description as a product of each logical term, thereby the logical product can be a hard logic as it is.

It is needless to say that an output from the circuit is a specific decode signal from the original signal.

According to this method, "control" requiring a jumping control, a multiplexing control and the like is easy to be added thereto optionally.

Moreover, it is obvious in the art that a software processing instead of the hard logic with the control functions described above can be performed, which is included in the present invention.

Programming Specification

Figure 2A:
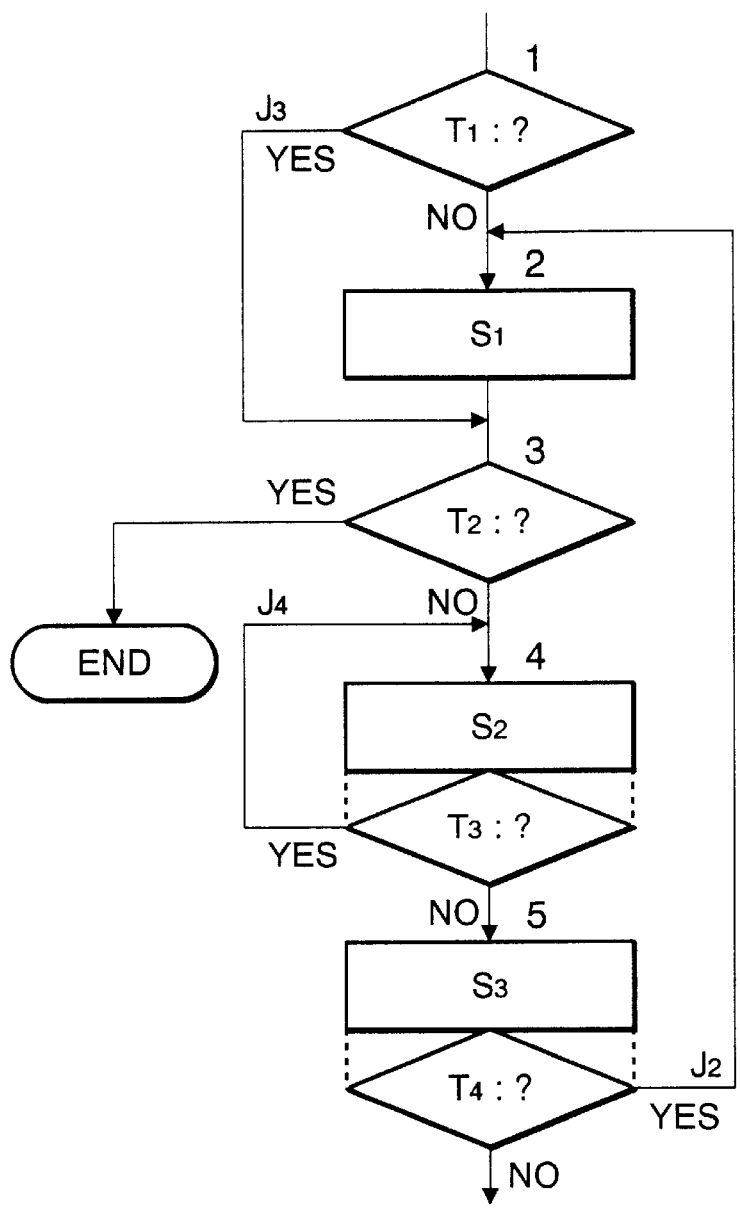
FIG. 2 shows examples of flow charts describing orders of sequences.

FIG. 2A shows an example of a basic flowchart used for the device of the present invention. FIGS. 5A and 5B show examples of a programming, namely a memory input basic form.

Symbols and numbers are practically used as a basic form of memory input writing data, namely input data for the programming.

Figure 2B:
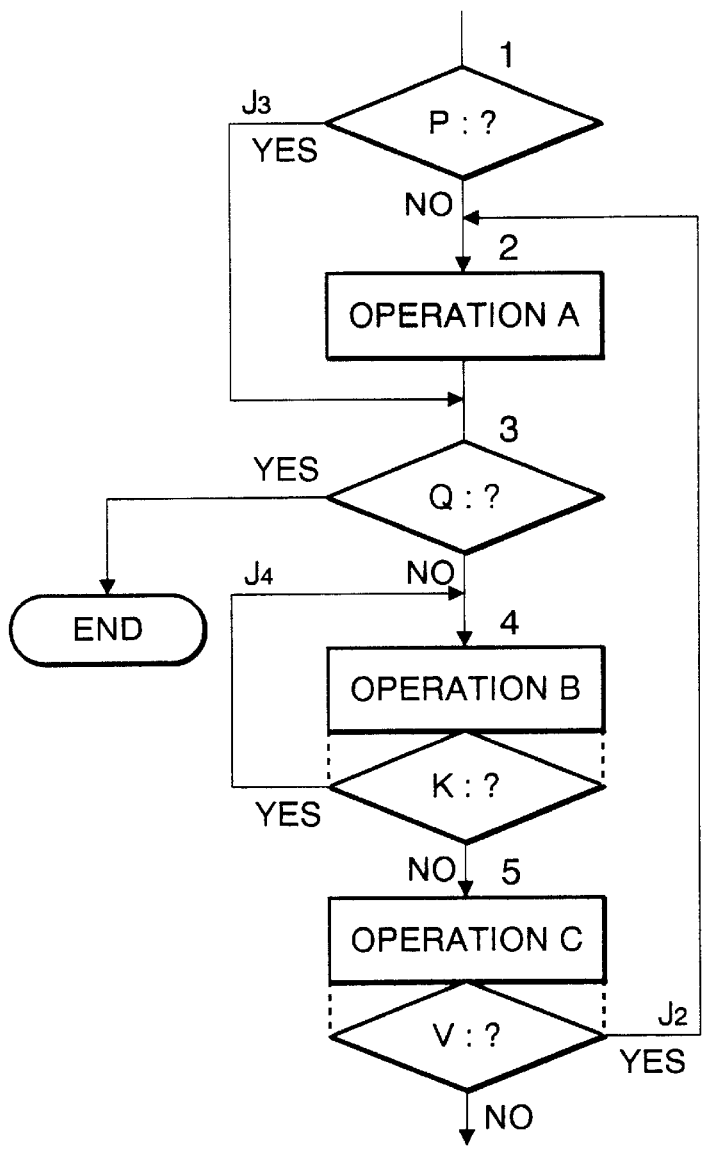

FIG. 2B shows another example of a flowchart which is treated similarly to the basic flowchart by adding simple corrections.

In this case, preliminary corrections of the symbols are needed as described in Supplementary Note 1.

In addition, any general flowchart can be applied to the present system even if the symbols of the flowchart, for example in FIG. 2B, are rewritten in such descriptions enclosed by " " as described in Supplementary Note 2. However, in this case, preliminary preparation work is required to correct each content for the above-mentioned "basic form" as input data. A conversion software can omit this procedure.

Figure 3:
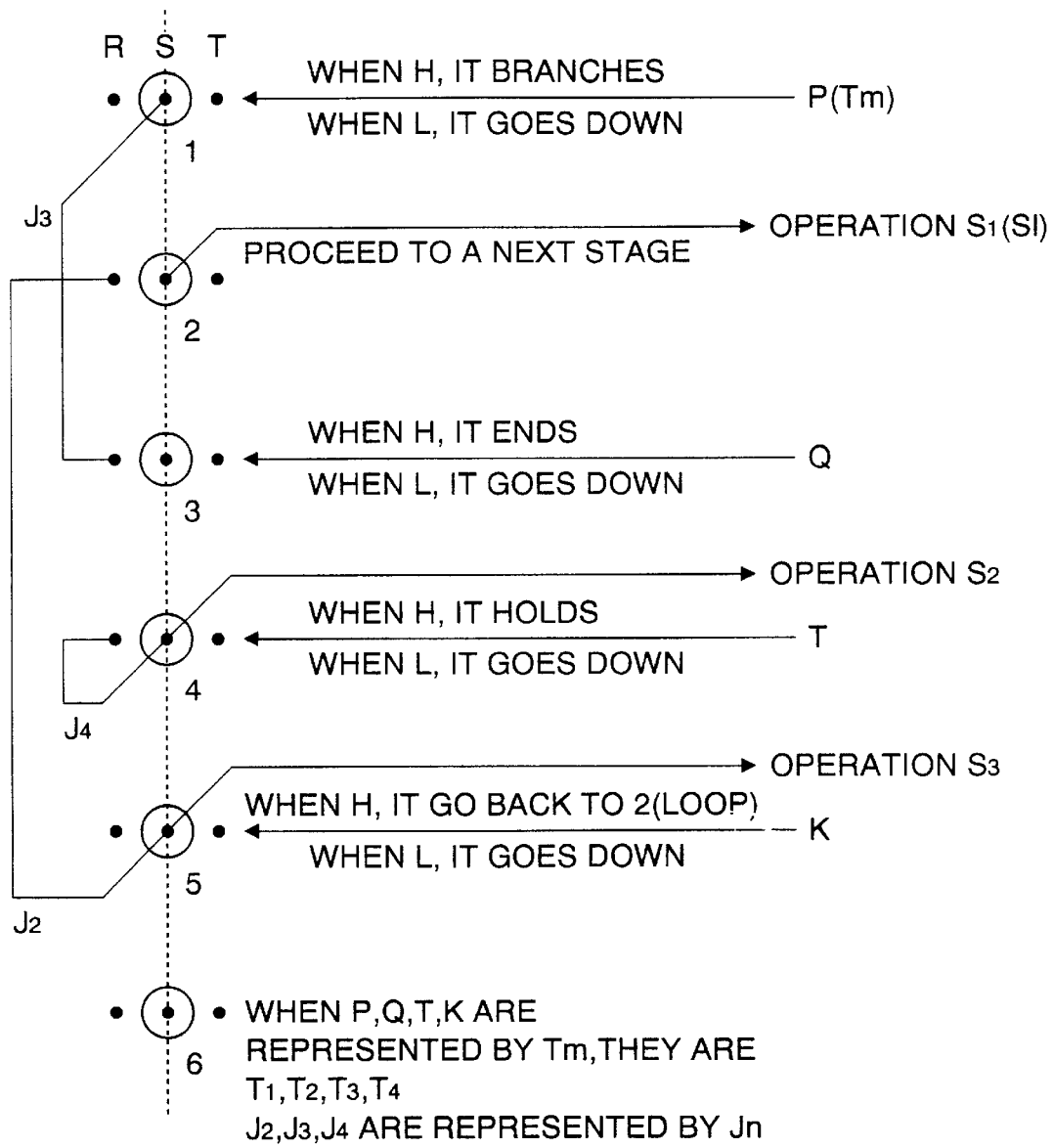
FIG. 3 shows a program wiring diagram of the conventional sequence control circuit.

Referring to FIGS. 3 and 5, an embodiment of the programming will be described.

In relation to an internal specification in the programming device, a memory is set to '0', namely logical 'L' when nothing is written to the memory. In relation to an R term, logic R solely can be written thereinto, and R=H is written thereinto concurrently when $J_n$ is written. Memory input data is written every logical element distinguishing an memory area, which may be written either in parallel or in serial. For an easier understanding, the data is stored in the memory in parallel in the embodiment. Symbol :? is ignored in inputting the memory.

Conventional programming is performed as shown in FIG. 3 corresponding to the flowchart shown in FIG. 2, as described above. According to the present invention, a software basic form shown in FIGS. 5A or 5B is written into the memory as input data in programming.

In FIG. 3, input/output signals at each stage are processed to be operated as described. Referring to FIG. 3, operating statuses of FIG. 5 will be described.

i) Memory written soft logics $J_3$ and $T_1$ (see Note in FIG. 3) are in a sequence stage 1 (memory address 1).

These correspond to a first stage in FIG. 3 where it branches to 3 when a logic of $T_1$ is H and it proceeds down when the logic is L. According to the present invention, memory written $J_3$ code (concurrently R=H is written, as described above), a logic value H of R and T corresponding to the input signal $T_1$ are read at executing time.

When T=H, R and T logics operate a branch control line Z at the hard logic output signal Z=H with a logic function (6) as described above. Referring to FIG. 4, the $J_3$ code is inputted to the memory address producing circuit 22 to determine a next stage, in other words, '3', namely to branch into a stage 3.

When T=L, a (4) hard logic output signal is X=H similarly referring to the table, thereby an order control line X is operated. Referring to FIG. 4, an address code of an incrementer 221 is set to the address producing circuit 22 to proceed to a next stage '2'.

Accordingly, the operations of the conventional device and the present invention are well matched at each step.

ii) A soft logic $S_1$ is in the stage 2 (memory address 2). This corresponds to an operation $S_1$ at the second stage in FIG. 3. R, T and a control code S are added to each logic circuit by reading the memory at execution time. Logical states of the signals at that time are shown in table 4.

An external selecting circuit decoder is operated by the control code $S_1$ to specify a sequence output $S_1$, which performs an operation $S_1$ as the sequence control signal. As to a control function value, the order control signal X=H is outputted by a logic circuit corresponding to a function (4) as described in the table, thereby the sequence is proceeded from 2 to 3.

iii) $T_2$ is in a stage 3. This corresponds to a third stage in a hard of the conventional device in FIG. 3 where it ENDs when $T_2$=H and it proceeds down when $T_2$=L. Data R·T are read from the memory at execution time to operate logically as shown in FIG. 5.

iv) Similarly, operations of $S_2$, $J_4$ and $T_3$ in a stage 4 corresponding to the fourth stage and $S_3$, $J_2$ and $T_4$ in a stage 5 corresponding to the fifth stage verifies a fact that the operations of the conventional device and the present invention are well matched at each step.

As described above, according to the present invention, there is almost no concept of an order, a dedicated language and a convention symbol such as a rudder symbol, a logic gate symbol or the like which belong to a program language generally used, thereby fairly convenient, comprehensible and effective programming can be realized. In addition, there is no need to increase a hard or to connect corresponding to a number of sequence stages compared to the conventional system. Accordingly, applicability can be extremely extended.

TABLE 1

| | input/output signal | | | first term | second term | |
|---|---|---|---|---|---|---|
| segment | R | $S_1T_1 + \ldots +$ $S_m T_m$ | $S_{m-1}$ | in equation(1) $S_{t-1} \overline{\overline{R()}}$ | in equation(2) $R() \overline{\overline{R()}}$ | obtained value |
| I | L | L | S | S × H | L × L × H | S |
| II | L | H | S | S × L | L × H × L | L |
| III | H | L | S | S × H | H × L × H | S |
| IV | H | H | S | S × H | H × H × H | H |

S = H/L
( )represents $S_1T_1 + S_2T_2 + \ldots + S_mT_m$

TABLE 2

| control-related signal | | | | applied code | | | | code number | decode function for controlling |
|---|---|---|---|---|---|---|---|---|---|
| i | p | T | R | $2^3$ | $2^2$ | $2^1$ | $2^0$ | | |
| H/L | H/L | H/L | H/L | L | L | L | L | 0 | $xi\overline{RT} = a'$ |
| " | " | " | " | L | L | L | H | 1 | |
| " | " | " | " | L | L | H | L | 2 | $xi\overline{R}T = a''$ |
| " | " | " | " | L | L | H | H | 3 | |

TABLE 2-continued

| control-related signal | | | | applied code | | | | code number | decode function for controlling |
|---|---|---|---|---|---|---|---|---|---|
| i | p | T | R | $2^3$ | $2^2$ | $2^1$ | $2^0$ | | |
| " | " | " | " | L | H | L | L | 4 | |
| " | " | " | " | L | H | L | H | 5 | |
| " | " | " | " | L | H | H | L | 6 | |
| " | " | " | " | L | H | H | H | 7 | |
| " | " | " | " | H | L | L | L | 8 | $p \times \overline{RT} = \beta'$ |
| " | " | " | " | : | L | L | H | 9 | $p \times \overline{RT} = \gamma$ |
| " | " | " | " | : | L | H | L | 10 | $p \times R\overline{T} = \beta''$ |
| " | " | " | " | : | L | H | H | 11 | $p \times RT = \gamma$ |
| " | " | " | " | : | H | L | L | 12 | |
| " | " | " | " | : | H | L | H | 13 | |
| " | " | " | " | : | H | H | L | 14 | |
| " | " | " | " | H | H | H | H | 15 | |

$\alpha'$, $\alpha''$ are thrown into $\alpha = \overline{i\,T}\ \beta', \beta''$ are thrown into $\beta = p\ \overline{T}$
definition: $\alpha$: interrupt permission control $\beta$: order control $\gamma$: END control $\delta$: branch control
X mark: either H or L is available.

TABLE 3

| program logic | J | R | T | control function circuit output of (4), (5), (6) | | |
|---|---|---|---|---|---|---|
| | | | | X | Y | Z |
| $J_3, T_1:?$ | $J_3$ code | H | H ... L | L ... H | L ... L | H ... L |

TABLE 4

| program logic | J | R | T | S | X | Y | Z |
|---|---|---|---|---|---|---|---|
| $S_1$ | / | L | L | control code $S_1$ | H | L | L |

TABLE 5

| program logic | S | J | R | T | X | Y | Z |
|---|---|---|---|---|---|---|---|
| $T_2:?$ | / | / L | L | H ... L | L ... L | H ... L | L ... L |

When T=H, a control signal Y ENDs the program.
When T=L: a control signal X proceeds the program.
Term with / is not relevant.

What is claimed is:

1. A programmable sequence control device simulating flow chart sequences, which is a logic system comprising: a memory, a memory address producing circuit, a discrete bus for connecting to the address producing circuit, an internal control circuit for controlling separately an operation of the bus to transmit data corresponding to its purpose, an output signal selecting circuit and an input signal selecting circuit, wherein a first control code for specifying one output signal to external, a second control code for specifying one input signal from the external, a predetermined branch destination code as required and a convention code relating to an external bus control in case of forming the external bus as required are written into the memory preliminary based on a programming specification for performing an intended operation, wherein the internal control circuit updates the memory address of the memory automatically, reads continuously data written into the memory corresponding to its purpose by synchronizing with a clock signal, and operates the output signal selecting circuit by the control code when one of the control codes is read to operate one of plural output signals to be operated by first to third controls for performing a predetermined operation in the logic system, and input signals (i) specify one of the input signals from the external by the input signal selecting circuit with operating other control codes concurrently read with the control codes, and input the specified input signal to the internal control circuit, (ii) input a convention code relating to the external bus control to the internal control circuit directly, and (iii) input the input signal directly from the external to the internal control circuit as required, wherein each input signal of i), ii) and iii) is applied a processing code being its logic value as each variable and is defined depending on its purpose, in which control functions capable of decoding them to discrete specific signals are determined depending on its purpose, each function value which is each signal value for operating effectively is limited as true or false, its function of the function value is determined, and other function is to be a hard logic, and wherein the bus depending on its purpose in relation to the internal control circuit performs a first control for inputting data from an incrementer determining a code corresponding to predetermined normal order to the memory address producing circuit via the bus by each output signal of the hard logic, a second control for inputting a branch destination code outputted from the memory to the memory address producing circuit and a third control for inputting a content of the external bus to the memory address producing circuit, one of the first to third controls is performed automatically whenever a memory address is updated.

2. The programmable sequence control device simulating flow chart sequences according to claim 1, wherein the output signal selecting circuit is the decoder and the input signal selecting circuit is the multiplexer.

* * * * *